Nov. 4, 1952
C. L. SCHEER
2,616,946
GASKET TYPE SEALING STRUCTURE HAVING DEFORMABLE METAL RINGS
Filed June 28, 1949
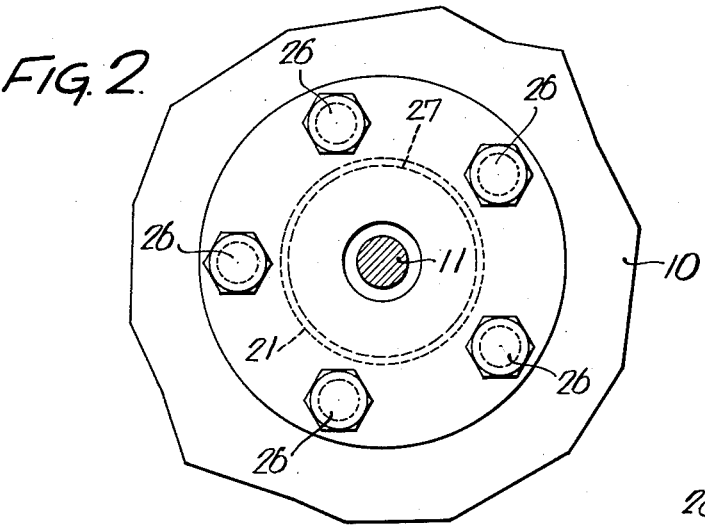
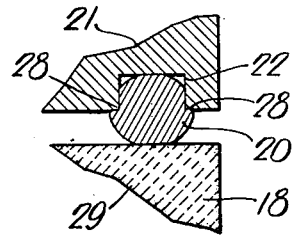
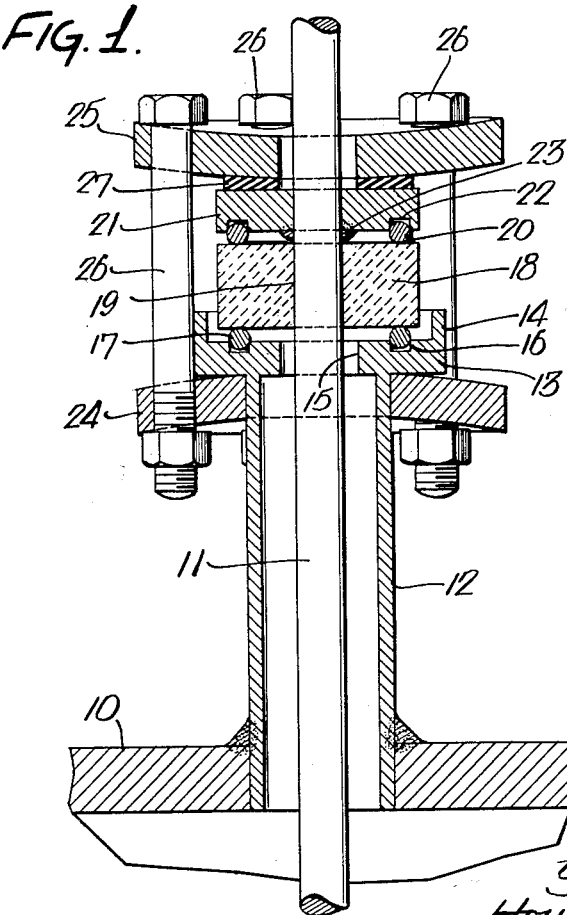
Inventor:
Charles L. Scheer
by his Attorneys
Howson & Howson Patented Nov. 4, 1952

2,616,946

UNITED STATES PATENT OFFICE 2,616,946

GASKET TYPE SEALING STRUCTURE HAVING DEFORMABLE METAL RINGS

Charles L. Scheer, Haddonfield, N. J., assignor to Foote Mineral Company, Philadelphia, Pa., a corporation of Pennsylvania Application June 28, 1949, Serial No. 101,854

2 Claims. (Cl. 174—151)

This invention relates to gasket-type sealing structures for use in instances where it is desired to provide a gas-tight seal. More particularly, the invention relates to sealing structures for use in conjunction with electrodes that are employed to introduce electrical voltages or currents into vacuum or pressure-tight vessels.

Electrode sealing structures which have been employed in the past have generally been of two types, one involving the use of a deformable gasket, and the other involving a glass-to-metal seal.

The first of these two types usually employs rubber or a similar compressible substance as the gasket material, since its deformation pressure is of low order. The properties of such a sealant limit its usefulness, and sealing structures of this type have generally been limited to usage at low temperatures below 300° F.

The second type of sealing structure is also limited as to usage. Sealing structures of this type are also unsuitable for use at high temperatures or where electrical currents of high value are used.

Due to their limitations, the above-mentioned prior sealing structures have been unsuitable for use in certain instances. For example, such structures are unsuitable for use in apparatus for effecting deposition of certain metals and in which electrical currents are employed having values in excess of 200 amperes.

The principal object of the present invention is to provide a novel gasket-type sealing structure which can be used where high temperatures are involved.

Another object of the present invention is to provide a novel gasket-type sealing structure which is especially adapted for use in conjunction with an electrode where high temperatures and/or high value electrical currents are involved.

Still another object of the invention is to provide a sealing structure wherein a metal gasket is employed in conjunction with a ceramic member in such a manner that a gas-tight seal is effected between the gasket and the ceramic member, and said member is subjected to compressive force in creating the seal. It is characteristic of ceramic bodies that they have rather low tensile strength which prohibits their use in any application requiring uneven mechanical stresses. In the structure provided by the present invention, the ceramic member employed is subjected to evenly applied compressive force, and when thus used, such member is capable of withstanding forces approximately five times its tensile limit.

A further object of the invention is to provide such a sealing structure wherein the metal gasket is subjected to shearing action, and due to the high unit force obtained at the shearing edge, very intimate contact is developed and maintained.

The invention may be more fully understood from the following detailed description with reference to the accompanying drawing, wherein Fig. 1 is a sectional view of an electrode sealing structure according to the present invention;

Fig. 2 is a plan view of the structure; and

Fig. 3 is an enlarged fragmentary sectional view of a portion of the structure.

Referring more particularly to the drawing, there is represented at 10 a portion of a metallic vessel into which a cylindrical electrode 11 extends. Extending upward from the said vessel is a metallic tubular member 12 which has a flange 13 at the top thereof. The flange 13 extends both inwardly and outwardly and is provided with an upstanding rim 14. A circular aperture 15, defined by the flange 13, serves to accommodate the electrode 11 and is of larger diameter than the electrode to prevent electrical contact between the electrode and the member 12. The flange 13 has an annular recess 16 therein which is concentric with respect to the electrode 11 and which serves to seat a metal ring 17 which constitutes a gasket. The ring 17 has a circular cross section of small diameter, and the recess 16 is narrower than the diameter of said ring. The purpose of this will be explained later.

Above the ring 17 is a cylindrical ceramic member 18 which has a central aperture 19 therein to accommodate the electrode 11. The upper and lower faces of ceramic member 18 are flat, and the lower face thereof is in annular engagement with the ring 17.

Above the ceramic member 18 is a second metallic ring 20 similar to the ring 17 and also constituting a gasket. The ring 20 is in annular engagement with the upper face of member 18. A metallic disk 21 is disposed above the ring 20 and has an annular recess 22 which is concentric with respect to the electrode 11 and which seats the ring 20. The recess 22 is narrower than the diameter of the ring 20 for a purpose which will be explained later. The disk 21 is apertured to accommodate the electrode and is soldered to the electrode, as indicated at 23, the solder extending circumferentially of the electrode and forming a complete seal between the disk and the electrode.

As hereinafter more fully described, a seal is created and maintained at each of the gasket rings 17 and 20 by the application of compressive forces. To this end, there are provided apertured plates or disks 24 and 25 and associated bolts 26. Plate 24 surrounds the upper tubular portion of member 12 and engages the lower face of flange 13. Plate 25 is disposed above the disk 21, and its aperture is of larger diameter than the electrode. An apertured insulating disk 27 is interposed between the disk 21 and the plate 25. Preferably, the plates 24 and 25 are dished as illustrated to give a spring action. By tightening the bolts 26, compressive pressures are applied to the sealing structure to effect the desired seals.

As may be seen in Fig. 1, the structure provided by the invention seals the vessel 10 at the place of entry of the electrode 11. As mentioned above, the disk 21 is soldered to the electrode, thus providing a seal at that point. The ceramic member 18 and the gasket rings 17 and 20 provide annular seals about the electrode, and the ceramic member 18 also serves to insulate the electrode from the associated metallic elements. Because of this insulating requirement, the yield point of the metal of which the gasket rings are formed should be lower than the pressure at which the ceramic member would fracture.

It will be noted that the ceramic member 18 is subjected to evenly applied compressional forces and is not subjected to any tensional stress. In this connection, it should be noted that the recessed members 13 and 21 serve as retainers for the gasket rings 17 and 20, and they maintain the gasket rings in true concentric relation with respect to the electrode 11. Since the gasket rings are similar, the compressional forces exerted on the ceramic member 18 are directly opposed to one another.

As mentioned above, the cross-sectional diameter of each of the rings 17 and 20 is somewhat greater than the width of the recesses 16 and 22. Consequently, when force is exerted by tightening the bolts 26, there is a shearing or biting action on each of the rings as illustrated in the enlarged sectional illustration of Fig. 3. In other words, the annular edges formed by the associated recess bite into the ring as may be seen at 28 in Fig. 3. At the same time, the metallic gasket ring is somewhat deformed and is somewhat flattened against the ceramic member 18 as may be seen at 29 in Fig. 3. The shearing or biting action on each gasket ring not only serves to fix the axial alignment of the forces but also effects a tight seal between the gasket and the associated metal member. It should be noted that there are two concentric shearing edges associated with each gasket ring.

In a particular physical embodiment of the invention where the temperature requirements were in the range of 300° to 350° C., a close grained ceramic disk having a diameter of 1 3/16" was employed as the member 18, and the rings 17 and 20 had a diameter of 1/8" and were formed from lengths of pure electrical conductor grade aluminum wire curved to circular form and having their ends welded. The tubular member 12 was formed of nickel, while the disk 21 was formed of hardened steel and was silver soldered to the electrode 11. The plates 24 and 25 were hardened steel plates. The insulating disk 27 was formed of mica which is capable of withstanding the compressive forces involved. It was found that the ceramic member 18 was capable of withstanding compression forces of approximately 65,000 pounds per square inch, while the aluminum rings would yield readily at 40,000 pounds per square inch to the degree where a vacuum tight seal could be effected.

It will be apparent of course that the materials of which the various parts are formed is largely a matter of choice depending upon the requirements of the particular application in any instance. Of course, in any case the member 18 should be formed of ceramic material and the associated rings should be formed of suitable metal. Any insulating ceramic material may be employed whose compressive strength exceeds the yield point of the gasket rings. An example is Isolantite which is a close grained ceramic. Some examples of gasket metals that might be used are copper, iron, lead and tine.

From the foregoing description, it will be apparent that the structure provided by the invention is particularly characterized in that a seal is effected by providing annular contact between a metal gasket ring and a ceramic member, and by exerting pressure so as to provide an annular seal throughout the annular contact of the ring and said member. Further, the invention contemplates a dual ring structure as illustrated and described.

It will be apparent that the invention is not limited to the particular structure illustrated but is capable of various modifications and further embodiments.

I claim:

1. Apparatus of the class described, comprising a metallic vessel having an opening, an electrode extending through said opening, a metallic tubular member extending from said opening in surrounding relation to said electrode, a flange at the outer end of said member having an annular recess providing cross-sectionally square edges, a metallic ring of circular cross-section surrounding said electrode and seated by said recess, the ring being of larger cross-sectional diameter than the width of said recess, a ceramic member surrounding said electrode and engaging said ring, a second metallic ring of circular cross-section surrounding said electrode and engaging said ceramic member, a metallic member surrounding said electrode and sealed thereto, said last member having an annular recess seating said second ring, the latter recess having a width less than the cross-sectional diameter of said second ring and providing cross-sectionally square edges, and means for exerting forces on said first and last members to press said rings against said ceramic member and to cause said edges to bite into said rings.

2. Apparatus of the class described, comprising a metallic vessel having an opening, an electrode extending through said opening, a metallic tubular member extending from said opening in surrounding relation to said electrode, a flange at the outer end of said member having an annular recess providing cross-sectionally square edges, a metallic ring of circular cross-section surrounding said electrode and seated by said recess, the ring being of larger cross-sectional diameter than the width of said recess, a ceramic member surrounding said electrode and engaging said ring, a second metallic ring of circular cross-section surrounding said electrode and engaging said ceramic member, a metallic member surrounding said electrode and sealed thereto, said last member having an annular recess seating said second ring, the latter recess having a width less than the cross-sectional diameter of said second ring and providing cross-sectionally square edges, a pair of dished plates respectively arranged adjacent said flange and said last member, and a plurality of bolts connected between said plates to cause the plates to exert forces on said flange and said last member, thereby to press said rings against said ceramic member and to cause said edges to bite into said rings.

CHARLES L. SCHEER.

REFERENCES CITED

The following references are of record in the file of this patent:

UNITED STATES PATENTS

| Number | Name | Date |
| --- | --- | --- |
| 1,001,363 | Dayton | Aug. 22, 1911 |
| 1,588,804 | Parrish | June 15, 1926 |
| 1,821,866 | Wilson | Sept. 1, 1931 |
| 2,134,578 | Remscheid | Oct. 25, 1938 |

FOREIGN PATENTS

| Number | Country | Date |
| --- | --- | --- |
| 852,026 | France | Oct. 16, 1939 |